Feb. 25, 1964  TOSHIROO YAMADA  3,122,126
FISH FARMING EQUIPMENT OF MANY FISH TANKS
Filed Sept. 12, 1961
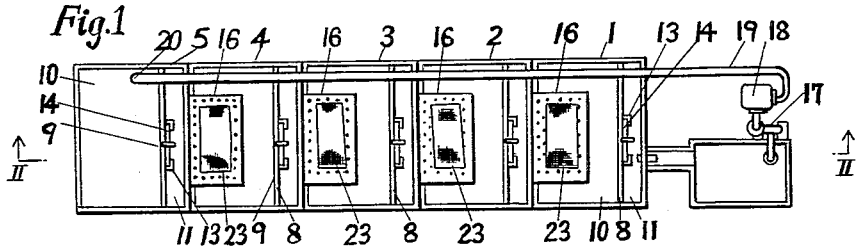
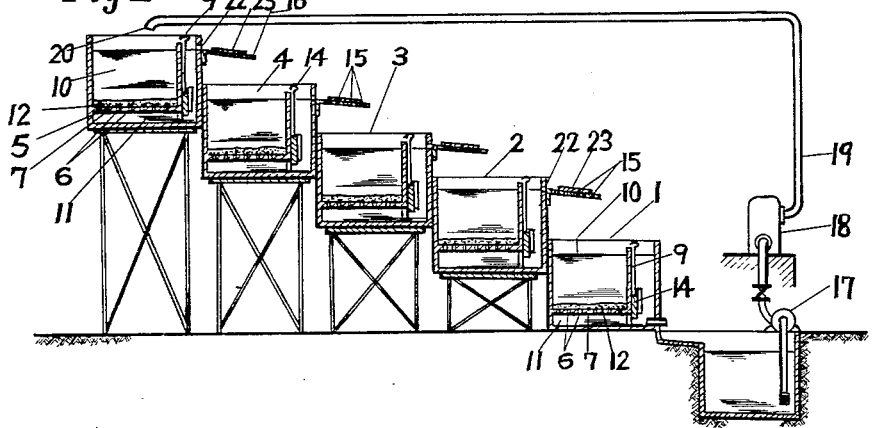
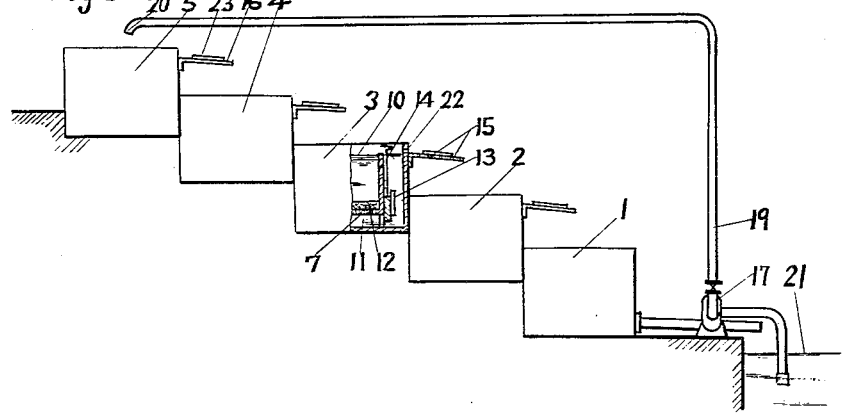
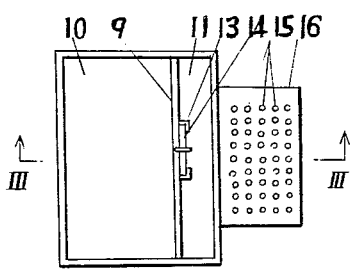
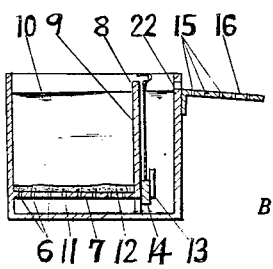
INVENTOR.
TOSHIROO YAMADA
BY
McGlew and Toren
ATTORNEYS

United States Patent Office 3,122,126
Patented Feb. 25, 1964

3,122,126
FISH FARMING EQUIPMENT OF MANY
FISH TANKS
Toshiroo Yamada, 32–2 Dekimachi, Anan City, Japan
Filed Sept. 12, 1961, Ser. No. 137,607
7 Claims. (Cl. 119—3)

This invention relates to improved fish farming equipment comprising many fish tank which are each divided into a room for fish and a room for filtered water by a filter plate. The tanks are arranged in multi-stage order with the room or filtered water of a higher fish tank being communicated to the room for fish of a lower fish tank through a water sprinkling plate. In addition pump means are provided for supplying the highest fish tank's fish room with clean and pure water.

One object of the present invention is to breed marine animals, such as sea-water or fresh-water fish.

Another object of the present invention is to provide fish farming equipment wherein noxious nitrogenous compounds contained in fish excrement is removed.

Another object of the invention is to provide fish farming equipment including filter means for removing such impurities as dust, lint, etc.

Another object of the present invention is to provide a multi-stage arrangement of fish tanks wherein each fish tank is aerated.

In the accompanying drawings, in which a preferred form of the present invention is illustrated:

FIGURE 1 is a plan view of the fish farming equipment,

FIGURE 2 is a cross sectional view taken along line II—II of FIGURE 1,

FIGURE 3 is a front view, partly in section, of the fish farming equipment showing a pumping pipe connected between the highest fish tank and a sea or river, FIGURE 4 is a magnified plan view of the fish tank of the fish farming equipment, FIGURE 5 is a cross sectional view taken along line III—III of FIGURE 4.

As shown, the fish tanks 1, 2, 3, 4 and 5 are arranged in ascending elevational order. Tank 1 is at the lowest elevation and tank 5 is at the highest elevation.

An L-type plate comprising a horizontal filter plate 7, having many small holes 6 therethrough, and a vertical plate 8 divides each fish tank into the room for fish 10 and the room for filtered water 11.

Filter sand 24, on the surface of the plate 7, forms a filter section which is designated, generally, by the reference numeral 12.

A closure plate 14 having a pull is put into guides 13 for up and down movement in the guides.

A water sprinkling plate 16, with many small holes 15, protrudes over the fish room 10 of each lower fish tank from the side wall of the filtered water room of each higher adjacent fish tank.

A pipe 19, having a discharge nozzle 20 at one end thereof, runs from an outlet of a filter tank 18 to a point above the fish room 10 of the highest fish tank 5; the discharge nozzle 20 of the pipe 19 being immediately above the fish room 10. The discharge side of a pump 17 is connected by suitable pipe means to an inlet side of the filter tank 18. As shown at FIGS. 1 and 2, the suction side of the pump 17 communicates with a sump or trough; the sump or trough being arranged with respect to the lowest fish tank 1 to receive water therefrom.

If, instead of using a sump or trough to recirculate the water continuously as in FIGS. 1 and 2, it is desired to pump fresh water from a sea or river, the arrangement illustrated at FIG. 3 can be used. As shown, the suction side of a pump 17 is immersed in a sea or river 21 and the pipe 19 is directly coupled with the discharge side of the pump 17.

A water supply nozzle 22 is provided in the side wall of each fish tank, as shown at FIG. 5.

A cloth 23 to trap impurities is positioned on the water sprinkling plate 16.

The filter section 12 divides each fish tank into a room for fish 10 and the room for filtered water 11, so injurious nitrogenous compounds contained in the excrement of the marine animals of sea water fish and fresh-water fish, and the impurities in the room for fish 10 are filtered perfectly by the filter part 12 at the border between the rooms 10 and 11 when water passes from the room for fish 10 to the room for filtered water 11, through the filter sand 24 and the holes 6 in the filter plate 7.

The nitrogenous compound is disassimilated by bacteria grown thick in the filter sand 24 and the impurities of dust and the other foreign matter is stopped by the filter plate 7.

Only filtered water of good quality is supplied into the room for fish 10 from the nozzle 20 of the pumping pipe 19 and into the room for filtered water 11 of the higher fish tank, so that water in the room for fish 10 is always of good quality and suitable for the farming of the sea water fish and fresh-water fish which are difficult to breed.

The inner part of each fish tank is divided by the L-type plate of the horizontal filter plate 7 and the vertical plate 8. The flow of water from the room for fish 10 to the room for filtered water 11 is through the small holes 6 of the horizontal filter plate 7. The impure water in the room for fish 10 always flows into the room for filtered water 11 and is filtered perfectly by the filter sand on the leveling filter plate 7. The filtered water in each room for filtered water 11 is supplied to the room for fish 10 of a lower fish tank continually, and the impure water in the room for fish 10 is, thereby, changed into the pure water continually.

When the closure plate 14 is moved down in the guides 13 and the supply of water in the room for filtered water is shut off in each fish tank, the impure water with the impurities in the room for fish 10 is overflowed in each fish tank to the cloth 23 to trap the impurities on the water sprinkling plate 16.

The cloth 23 may be removed from plate 16 when the impurities thereon need to be removed.

The water sprinkling plate 16 protrudes over the room for fish 10 of a lower fish tank from a side wall of the room for filtered water 11 of each fish tank, so that fresh water of good quality in the room for filtered water is aerated perfectly by passing through the many small holes 15 of the plate 16 at the time of the supply of water to the room for fish 10. The water on the top surface of the room for fish 10 is aerated by the air above it. The discharging water from the nozzle 20 is aerated by the surrounding air, therefore, the aeration is held throughout the system perfectly. Each fish tank 2, 3, 4, 5 is arranged at a higher position from the lowest fish tank 1 in dynamic head, so that the convection flow from the room for fish to the room for filtered water is held naturally and the supply of water in dynamic head from the room for filtered water 11 to the room for fish 10 among each fish tank is held continually. Thus, the convection flow necessary to breed marine animals is kept in each fish tank. Because of only the protraction of the pumping pipe 19 with the pump 17 from the lowest fish tank 1 to the highest fish tank 5, the convection current in each fish tank and the natural supply of water by dynamic head among each fish tank are kept continually. Thus, adjunctive equipment of airlift and siphon etc. is unnecessary. The cost of equipment is economical. The power rate is for one pump. The management required for the equipment is considerably less than in presently known systems.

The water need not be changed for a long time.

Since breeding water in large quanties is not required the present fish farming equipment may be easily assembled at desirable locations in a midtown area.

As the breeding water is unnecessary to be displaced into the fresh water, the management and cost for the replacement of water is unnecessary.

The fish farming of sea water fish or fresh-water fish, which are difficult to farm, provides excellent results by perfect filtration, convection current, airation and supply of water in dynamic head between each fish tank.

I claim:

1. Fish farming equipment comprising many fish tanks, each tank being divided into a room for fish and a room for filtered water by filter means, said filter means comprising sand having bacteria thereon.

2. Fish farming equipment, according to claim 1, wherein the room for filtered water of a higher fish tank is communicated to a room for fish of the lower fish tank through an apertured plate filter cloth.

3. The farming equipment, according to claim 1, wherein pumping means are provided for circulating water from the lowest fish tank to the room for fish of the highest fish tank.

4. Fish farming equipment, according to claim 1, a horizontal filter plate, including many small holes, and a vertical plate divides each fish tank into the room for fish and the room for filtered water within the tank.

5. Fish farming equipment comprising at least two adjacently situated fish tanks, one fish tank being at a higher elevation than the other, each fish tank having arranged therewithin an apertured horizontal plate and a vertical plate, said horizontal and vertical plates defining within the tank a fish room and a filtered water room, a layer of sand covering said horizontal plate, filter means extending from said higher elevation tank to a position over the fish room of the lower elevation tank defining a passage for enabling water from said higher tank to be aerated and discharged into the fish room of the lower elevation tank, means for allowing transfer of water from the higher tank to the lower tank, and pump means for supplying fresh water in an aerated discharge to the fish room of the higher elevation tank.

6. Fish farming equipment, according to claim 5, wherein said layer of sand is impregnated with bacteria for decomposing nitrogenous fish excrement compounds.

7. Fish farming equipment according to claim 5, wherein said pumping means is arranged to transfer filtered water from the filtered water room of the lower elevation tank to the fish room of the higher elevation tank.

References Cited in the file of this patent

UNITED STATES PATENTS

| | | |
|---|---|---|
| 1,564,903 | Shephard | Dec. 8, 1925 |
| 2,007,479 | Salles et al. | July 9, 1935 |
| 2,845,779 | Clark | Aug. 5, 1958 |
| 3,024,764 | Brittain et al. | Mar. 13, 1962 |

FOREIGN PATENTS

| | | |
|---|---|---|
| 321,769 | Switzerland | July 15, 1957 |